United States Patent [19]

Henrion et al.

[11] 3,742,254

[45] June 26, 1973

[54] AUTOMATIC MOS GROUNDING CIRCUIT

[75] Inventors: W. S. Henrion; Chang-Kiang Kuo, both of Houston, Tex.

[73] Assignee: Texas Instruments Incorporated, Dallas, Tex.

[22] Filed: Jan. 27, 1971

[21] Appl. No.: 110,083

[52] U.S. Cl. .................................. 307/251, 307/304

[51] Int. Cl. .......................................... H03k 17/60

[58] Field of Search ............... 307/205, 221 C, 251, 307/279, 304

[56] References Cited

UNITED STATES PATENTS

| | | | |
|---|---|---|---|
| 3,483,400 | 12/1969 | Washizuka et al. | 307/251 |
| 3,413,573 | 11/1968 | Nathanson et al. | 307/251 |
| 3,407,339 | 10/1968 | Booher | 307/251 |
| 3,523,284 | 8/1970 | Washizuka et al. | 307/221 C |
| 3,416,043 | 12/1968 | Jorgensen | 307/237 |
| 3,496,389 | 2/1970 | Zegarski et al. | 307/304 |
| 3,447,103 | 5/1969 | Port | 307/279 |
| 3,473,054 | 10/1969 | Wieczorek | 307/251 |
| 3,320,430 | 5/1967 | Gorman | 307/304 |

*Primary Examiner*—John W. Huckert
*Assistant Examiner*—R. E. Hart
*Attorney*—James O. Dixon, Andrew M. Hassell, Harold Levine, Melvin Sharp, Michael A. Sileo, Jr., John E. Vandigriff, Gary C. Honeycutt, Stephen S. Sadacca and Richard L. Donaldson

[57] ABSTRACT

An automatic grounding circuit has first and second insulated gate field effect transistor switches. The second transistor switch is coupled to the first transistor switch such that the second transistor switch is activated when the first transistor switch is grounded and deactivated when the first transistor switch is activated.

The second transistor switch transmits a voltage signal when the first transistor switch is activated and a ground signal when the first transistor switch is grounded.

3 Claims, 9 Drawing Figures

INVENTORS
W. S. Henrion
Chang-Kiang Kuo
BY Stephen Sodaro
ATTORNEY

AUTOMATIC MOS GROUNDING CIRCUIT

This invention relates to complex electronic systems and, more particularly, to complex electronic systems capable of integration on a single slice of semiconductor material, and their method of fabrication.

In the fabrication of complex electronic systems, each subsystem is usually tested before it is connected into the system. We have found in many instances, however, it is more desireable to fabricate the entire system at once prior to testing. Consider, for example, a complex electronic system integrated on a single slice of semiconductor material; certain manufacturing and reliability advantages are achieved by forming all of the circuit on the slice or substrate at the same time. In the fabrication of large scale integrated (LSI) circuits, one technique is to fix wire all connections of the circuits on the semiconductor substrate and then test the entire unit. If one element does not operate satisfactorily, the entire unit may be rejected. Consequently, yields are limited according to the fixed wiring approach and decrease with increasing circuit complexity. A more flexible approach is that of discretionary wiring by which the components and circuits may all be formed at the same time and may also be tested individually. In discretionary wiring, a unique connection pattern is generated for connecting only the satisfactory circuits into a desired system configuration after the circuits have been tested. That is, a separate unique metallization mask is required to be generated for each substrate processed by the discretionary wiring technique, even though the resulting "black box" LSI systems produced are electrically or functionally the same.

According to the present invention, highly complex semiconductor electronic systems, which one might consider in the realm of advanced large scale integration (ALSI), are achieved with substantially 100 percent yields and without the requirement and expense of specialized connecting patterns or unique metallization masks for each slice processed.

It is therefore an object of the invention to provide highly complex electronic systems having a large number of circuit functions with high yields.

It is also an object of the invention to provide means and techniques for fabricating complex high density advanced large scale integrated systems on a semiconductor slice.

These and other objects and advantages are accomplished in accordance with the present invention by providing a technique for fabricating portions of, as well as entire, complex systems, including all interconnects, at the same time; the system including means by which the subsystems can thereafter be isolated, tested and individually activated.

Complex electronic systems having sets of subsystems, including superfluous subsystems, are essentially permanently interconnected before testing. The interconnections include common electrically conductive bussing systems to which the subsystems are selectively coupled. The means coupling the various subsystems to the common bussing systems include enable circuits which isolate each of the subsystems from each other and from the common bussing systems. The subsystems are either tested when they are isolated from the bussing system and each other or are tested one-at-a-time while temporarily connected to the common bussing systems. The results of tests on each subsystem are stored and after all of the subsystems have been tested the enable circuits associated with those subsystems which meet the desired performance specifications and are necessary for completion of the desired final system are one-at-a-time enabled in a single step whereby all of the connections between a single subsystem and the common bussing systems are closed simultaneously.

The interconnections between the subsystems and between the subsystems and external conductors include common electrically conductive bussing systems to which the subsystems are selectively coupled. The means coupling the various subsystems to the common bussing systems include enable circuits which perform the function of isolating each of the subsystems from the common bussing systems and from each other. The subsystems are either tested when they are isolated from the bussing system and each other or are individually tested while being temporarily connected to the common bussing systems. The results of the tests on each subsystem are stored and after all of the subsystems have been tested, the enable circuits associated with those subsystems which meet the desired performance specifications and are necessary for completion of the desired final system are individually enabled in a single step, whereby all the connections between a single subsystem and the common bussing systems are or completed advantageously, either sequentially or simultaneously. The enabled subsystems are arranged in the desired system configuration by the existing connections and the subsystems not meeting the desired performance specifications or meeting such specifications but not necessary for the desired final system configuration are left isolated from the completed system. In this manner, random access memories, computing systems, and other complex electronic systems and subsystems having a large number of functions, may be economically mass produced with high yields.

Still further objects and advantages of the invention will be apparent from the detailed description and claims and from the accompanying drawings illustrative of the invention wherein:

MEMORY SYSTEM ON A SLICE

Figure 1:
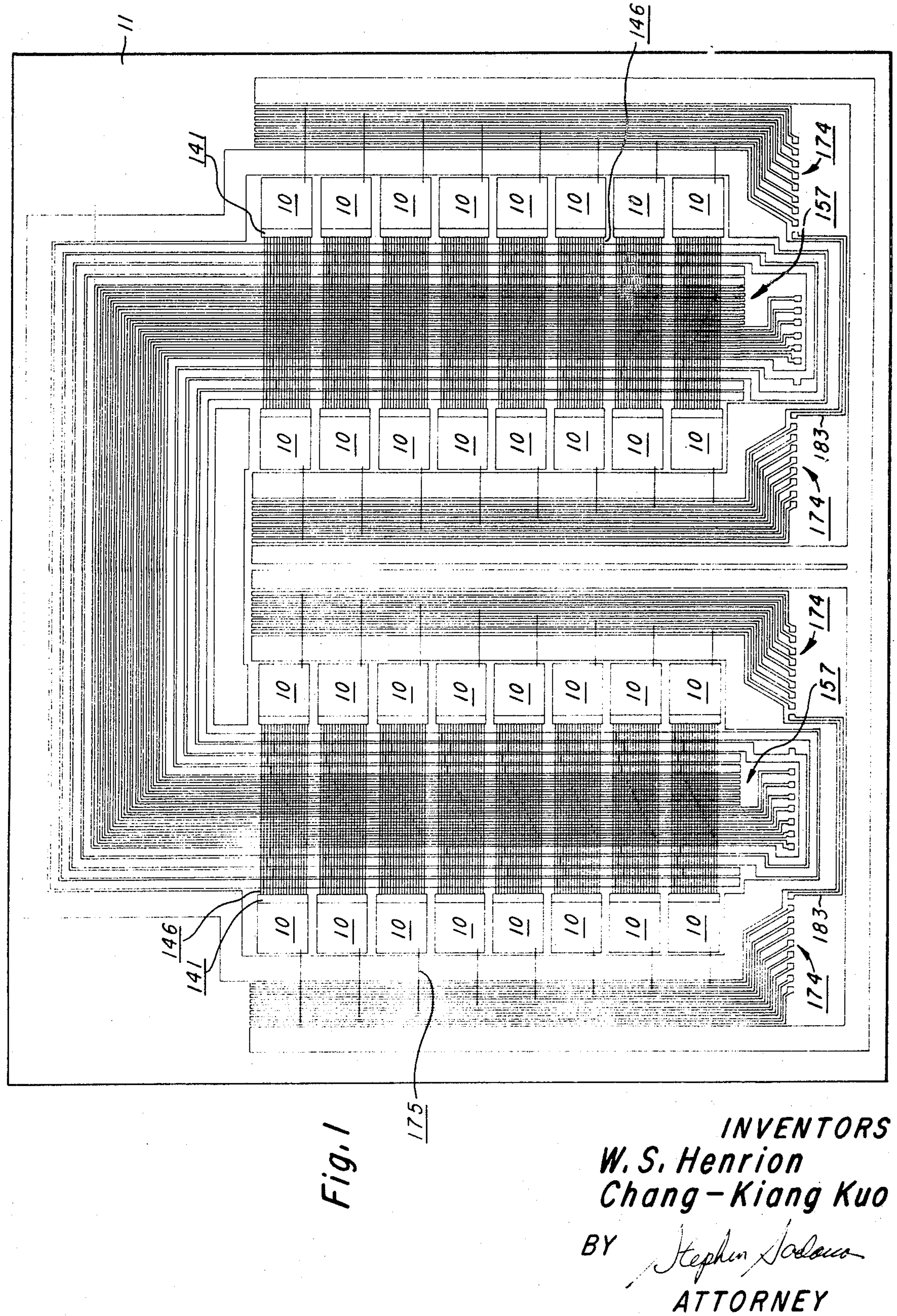
FIG. 1 is a plan view of a random access memory system in accordance with the invention.

One complex system embodying the present invention is an insulated gate field effect transistor random access memory system fabricated as a monolithic structure in a semiconductor slice, for example, formed of silicon, germanium or compound semiconductor material adjacent to its surface. As illustrated in FIG. 1, a preferred semiconductor memory system fabricated on 1-inch square semiconductor substrate 11 provides 17,408 bits of random access storage. The preferred system is comprised of 32 identical subsystems designated generally by the numeral 10 from which 17 subsystems meeting the desired performance specifications are selected to provide storage of 1,024 words having 16 bits each plus one parity bit for each word. The memory system includes a common bussing system 157, electrical conductors 174, for example, gold or aluminum, or other conductive materials positioned on the substrate in electrically insulated relation to the substrate, diffused tunnel electrical interconnects 146 and 175, and an enable circuit 141 associated with each of the 32 subsystems 10.

Subsystems 10, each being complex systems in themselves and performing large numbers of functions, are arranged in four columns with eight subsystems in each column. Common buss conductor system 157 is fabricated on substrate 11 such that all subsystems 10 have access thereto.

In the illustrated embodiment, common bussing system 157 is utilized to transmit address signals, clock signals, etc. to memory subsystems 10. Each subsystem 10 is coupled to common bussing system 157 by a set of diffused interconnects 146 and an enable circuit 141.

Conductors 174 are utilized to transmit input and output signals to and from subsystems 10. There are 32 conductors 174, each conductor being associated with a respective one of the 32 subsystems to which it is interconnected by a diffused tunnel interconnect 175. Since only 17 of the 32 subsystems 10 are necessary for completion of the 17,408 bit memory system, only 17 of conductors 174 are selectively utilized in the completed memory system Referring to the left half of semiconductor substrate 11, illustrated in FIG. 2, enable circuits 141 coupling each subsystem to common bussing system 157 provide means for isolating its respective subsystem from common bussing system 157. Generally, enable circuits 141 are comprised of sets of electronic switches which selectively open and close the conductive paths of the sets of interconnects 146 between a subsystem 10 and common bussing system 157, e.g., simultaneous interconnect. By biasing or unbiasing one of enable circuits 141, an entire subsystem is respectively connected or disconnected from the common bussing system in a selective mode, e.g., in a single step. In this manner, any one or more of subsystems 10 are isolated from or connected to common bussing system 157 and hence from the remainder of the system either temporarily for test purposes or permanently. The enable circuits are described in detail later in this description and shown in FIG. 6.

METHODS OF TESTING

Initially, in accordance with one embodiment of the invention, with no bias being applied to enable circuits 141, subsystems 10 are each isolated from common bussing system 157. In this mode, it is readily seen that subsystems 10 can be individually tested without affecting the remainder of the system; nor will any defects in one of subsystems 10 affect the test results of some other subsystem.

There are two preferred methods of testing systems fabricated in accordance with the techniques of the present invention, each readily adaptable to automated computer controlled testing. The first test process is characterized by the flow chart of FIG. 3. In order to utilize the method of FIG. 3, test pads (such as those illustrated in FIG. 4) are included in the paths of the subsystem conductors between the subsystem 10 and its enable circuit 141.

Figure 4:
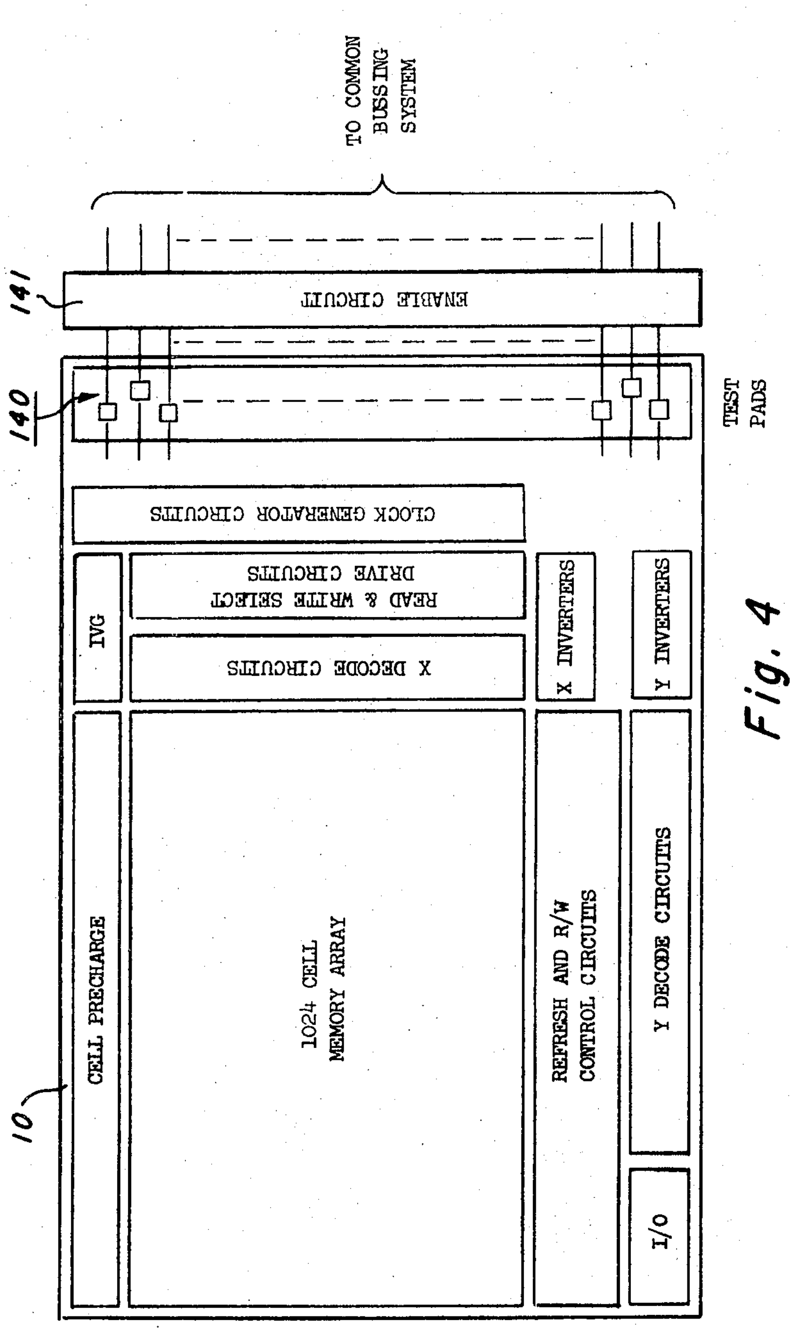
FIG. 4 is a plan view of a memory subsystem particularly pointing out the test pads.

Generally, subsystems 10, as illustrated in FIG. 4, are complex systems in themselves and include circuits for performing a large number of different functions. The various functions and circuits of the 1,024 bit memory subsystems 10 will be described in detail in another section of this specification. In addition to the subsystem circuits, each subsystem 10 includes test pads 140 which are utilized for testing subsystem 10 when enable circuit 141 is unbiased and subsystem 10 is located from the common bussing system. Again, enable circuit 141 is comprised of a set of electronic switches connected together so that all of the conductive paths entering subsystem 10 from the common bussing system are opened and closed simultaneously by the connection of a single wire or making a simple interconnection which effectively biases and energizes the enable circuit. A test pad 140 is provided in each conductor path between enable circuit 141 and the subsystem circuits so that electrical signals are supplied to and or from the subsystem circuits in lieu of signals supplied by the common bussing system when subsystem 10 is isolated from the common bussing system.

Figure 2:
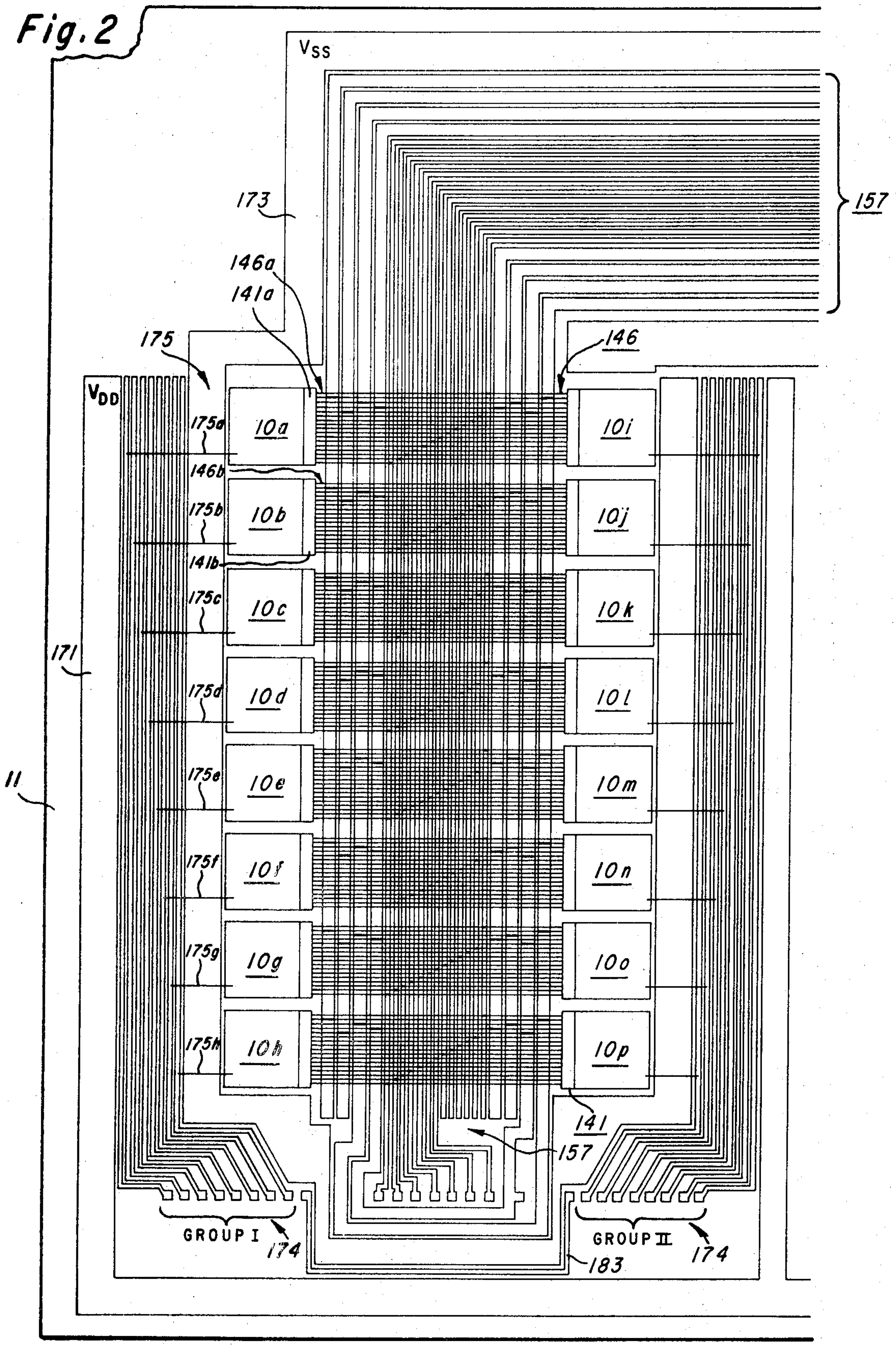
FIG. 2 is an enlarged plan view of the left half of the memory system of FIG. 1.
Figure 3:
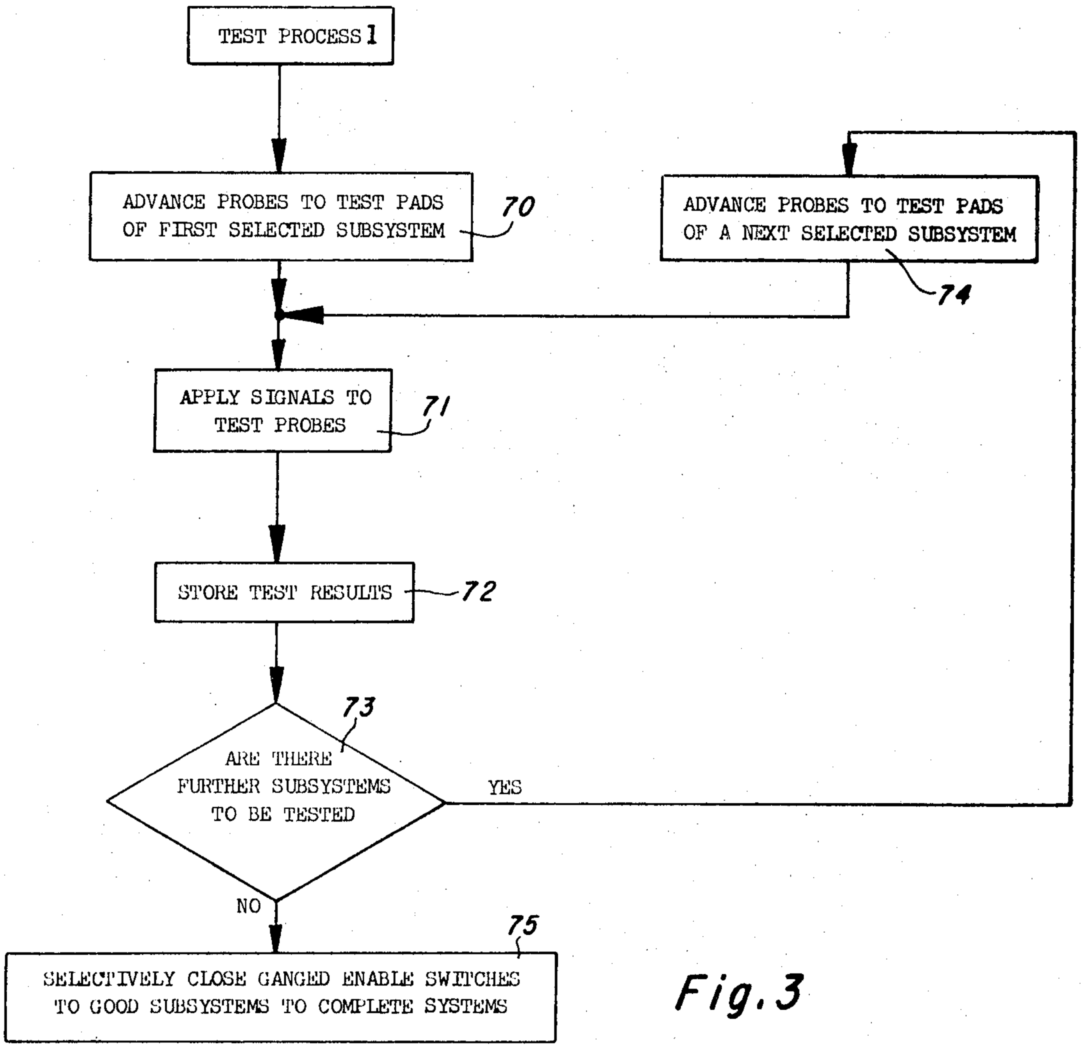
FIG. 3 is a flow chart illustrating a first test process for testing systems in accordance with the invention.

In the test process illustrated in FIG. 3, all of the subsystems 10 are isolated from common bussing system 157 during the entire test procedure. As a first step 70, test probes are advanced to the test pads 140 of an initially selected subsystem, for example, subsystem **10*a* (FIG. 2). Then, according to step 71, test signals are applied to the probes to test sybsystem 10*a*. The results of the tests which are measured either at selected Group I input/output conductors 174 (FIG. 2) or at selected test pads 140, are stored during step 72. That is, during step 72, (FIG. 3) the measured test results are compared to standard test results to determine whether subsystem 10*a*** meets the desired performance specifications. If it does meet these specifications, a "yes" is stored and the subsystem is suitable for use in the final system. If the specifications are not met, however, a "no" is stored and the subsystem is not utilized in the final system.

Next, during step 73, a determination is made as to whether there are further subsystems to be tested. If there are further subsystems, during step 74, the test probes are advanced to the test pads 140 of a next selected subsystem, for example, subsystem **10*b* (FIG. 2). Steps 71–73 are then repeated until, during step 73, it is finally determined that all subsystems requiring testing have been tested, in which case during step 75** the enable circuits of those subsystems which are both needed and meet the required performance specifications are selectively connected to complete the system.

Figure 5:
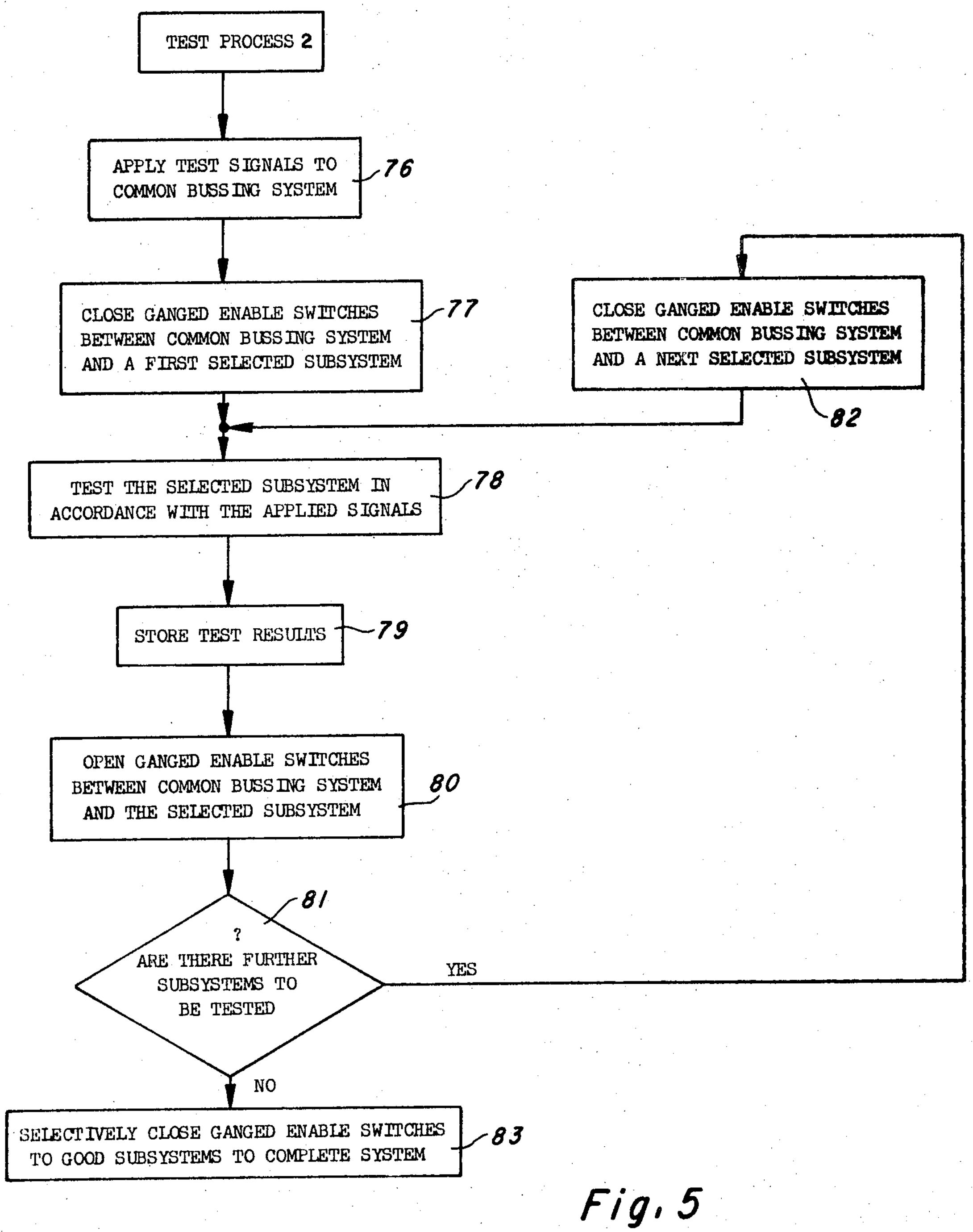
FIG. 5 is a flow chart of a second test process for testing systems in accordance with the invention.

A second test process, which is characterized in the flow chart of FIG. 5, eliminates the need for test pads 140 (FIG. 4) and the need for advancing test probes. This second test is an alternate to the first test. First, step 76 of the second process is to apply the test signals directly to common bussing system 157 (FIG. 2); the test signals remain on common bussing system 157 throughout the entire testing process. Next, step 77 is to temporarily bias the enable circuit 141 associated with a first selected subsystem 10 to close the ganged electronic switches in conductor paths 146 between common bussing system 157 and the selected subsystem, for example, subsystem 10*a*. This is achieved, for example, by selectively biasing as by appropriate probing of enable circuit 141*a*. Then, during step 78, subsystem 10*a* is tested in accordance with the signals applied to common bussing system 157, which are coupled via common bussing system 157, conductors 146*a* and enable circuit 141*a* to subsystem 10*a*. The test results are stored during step 79 and during step 80 the temporary bias is removed from enable circuit 141*a* opening switches in the conductor path between common bussing system 157 and sybsystem 10*a* to once again isolate subsystem 10*a* from common bussing system 157. A determination is made during step 81 as to whether there are further subsystems to be tested. If there are further subsystems to be tested, for example, subsystem 10*b*, then during step 82 the enable circuit 141*b*, having switches in the conductor paths 146*b* between common bussing system 157 and the next selected subsystem 10*b* is biased on, thereby closing all of such paths between subsystem 10*b* and common bussing system 157. Steps 78–81 are then repeated for subsystem 10*b*.

The test process continues until, during step 81, a determination is made that all subsystems requiring testing have been tested; in which case during step 83 the enable circuits of those subsystems which are both needed and meet the required performance specifications are selectively connected to complete the system. The selected connection is described in more detail later in the description. It should be remembered that, in this exemplary memory system embodiment, only 17 of the 32 available subsystems 10 are needed to produce a 17,408 bit memory system, and hence only 17 of the 32 associated enable circuits are selectively connected to common bussing system 157 for completion of the system.

Referring to the leftmost column of eight subsystems in FIG. 2, subsystems 10*a*–10*h* are interconnected to Group I of input/output conductors 174 by diffused conductors 175*a*–175*h*, respectively. Diffused conductor 175*a* is connected to the first Group I input/output conductor and diffused conductor 175*h* is connected to the last Group I input/output conductor. Since there are four columns of subsystems with each having a total of eight subsystems, and since a total of 17 good subsystems are necessary from the four columns for completion of the memory system, only four or five subsystems from each column are needed. Thus, only four or five of the Group I or first column subsystems 10*a*–10*h* are ordinarily required to meet the performance specifications. Similarly, in Group II, only four or five of the eight subsystems in that group ordinarily need meet the required performance specifications for completion of the system. A cross-over conductor 183 is provided in the event that one group (Group I or II) has more operable subsystems than required. The cross-over conductor 183 allows the shifting of a good subsystem from one group to its adjacent group. The entire input/output connection scheme for the complete memory system, including the connections to the common bussing system, is described in a copending application, Ser. No. 110,216, filed Jan. 27, 1971.

THE ENABLE CIRCUIT

In order to better understand enable circuits 141, their function and their operation in the memory system, they are here described in specific detail. As previously mentioned, enable circuits 141 coupling each subsystem 10 to common bussing system 157 are comprised of sets of electronic switches connected together whereby a large number of interconnections between subsystems 10 and common bussing system 157 are closed simultaneously. By biasing or unbiasing one enable circuit, enable circuit 141*a*, for example, entire subsystem 10*a* is selectively connected or disconnected from common bussing system 157 in a single step and with a single connection. In this manner, any one or more of subsystems 10 are isolated from common bussing system 157 for testing and then selectively connected to common bussing system 157 to complete the system. Since only 17 subsystems are required to complete the exemplary memory system of FIG. 1, a total of only 17 separate connections are required.

In the semiconductor memory system described herein, the enable circuits are integrated into the semiconductor system along with the other subsystem circuits. Since the memory system is comprised of metal-insulated-semiconductor field effect transistor circuits (MOS), it is preferable to utilize an MOS enable circuit in conjunction with the MOS memory system.

Figure 6:
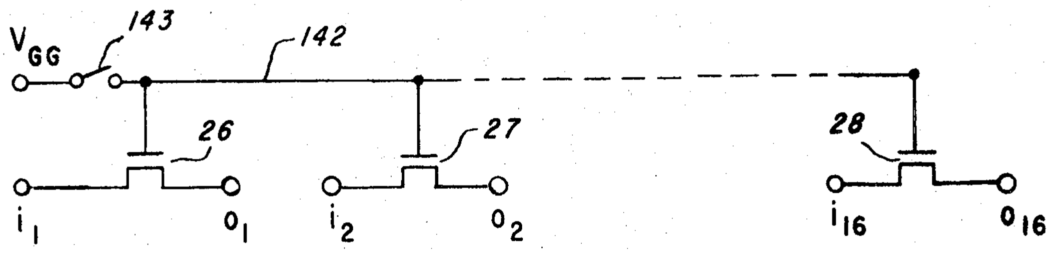
FIG. 6 is a circuit diagram illustrating a MOS enable circuit in accordance with the invention.

Generally, as illustrated in FIG. 6, the MOS memory enable circuits are comprised of 16 field effect transistors where 16 is the total number of conductors transmitting electrical signals to and from the circuits of subsystems 10 which are required to be disconnected for isolation of subsystems 10. For purposes of illustration, only first field effect transistor 26, second field effect transistor 27, and 16th field effect transistor 28 are shown. The output $o_1, o_2, \ldots o_{16}$ provided by the drains of transistors 26, 27, . . . 28, respectively, are connected to the various subsystem circuits as required for isolation of the memory subsystem. The sources of field effect transistors 26, 27, . . . , 28 are provided with signals $i_1, i_2, \ldots, i_{16}$, respectively, which are outputs from common bussing system 157. It should be here noted that the source/drain designation of the field effect transistors is not fixed and in other embodiments electrical signals are transmitted from the various subsystem circuits to the common bussing system utilizing the same enable circuit.

A common gate, represented in the circuit diagram of FIG. 6 by the numeral 142 is provided over the channel regions of all of the field effect transistors 26, 27, . . . , 28 comprising the electronic switches of enable circuit 141. Common gate 142 is biased by the application of a gate voltage $V_{GG}$. This is accomplished by closing switch 143 in the path between voltage $V_{GG}$ and common gate 142, thereby completing an electrically conductive path between applied voltage $V_{GG}$ and common gate 142.

When the path between voltage source $V_{GG}$ and common gate 142 is grounded, no bias is provided for common gate 142 and the associated subsystem 10 remains isolated from the remainder of the memory system, as no current will flow between the inputs $i_1, i_2, \ldots, i_{16}$ and the outputs $o_1, o_2, \ldots o_{16}$, respectively.

In the preferred system, switch 143 is actually a special field effect transistor switching circuit which automatically effectively grounds gate 142 of the enable circuit when the subsystem associated with such enable circuit is to be isolated from the system. The automatic grounding circuit will henceforth be described in detail. In still other embodiments, switch 143 is simply a single discretionarily bonded conductive wire between $V_{GG}$ and common gate 142.

Figure 7:
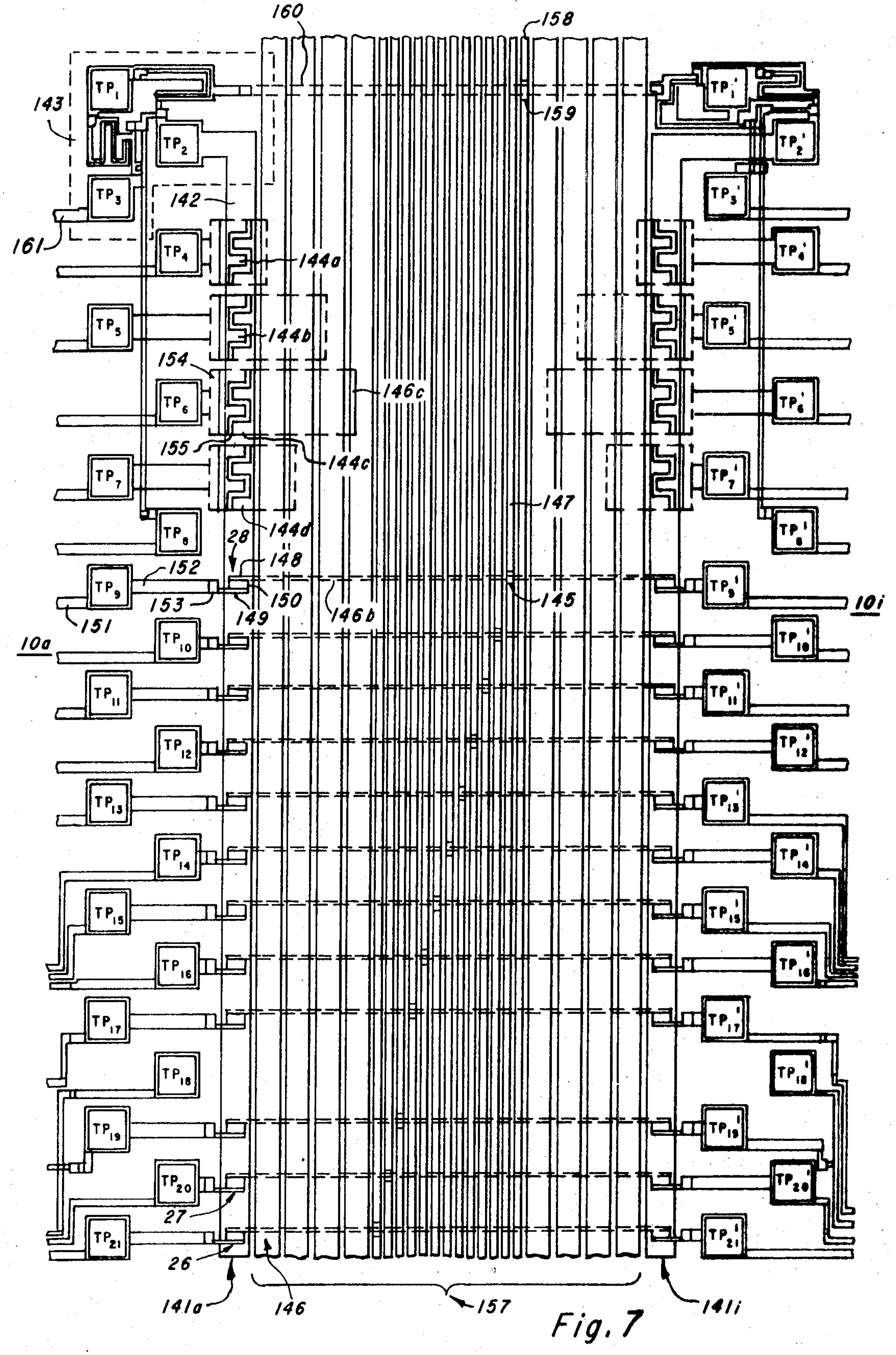
FIG. 7 is a plan view of a portion of the memory system illustrated in FIG. 1, particularly pointing out the MOS enable circuit and its relation to the common bussing system.

In order to better understand enable circuits 141 and their relationship to common bussing system 157 and diffused interconnects 146, reference is now made to FIG. 7. FIG. 7 illustrates a portion of FIG. 2 showing in detail the test pads of subsystems **10*a* and 10*i*, their associated enable circuits 141*a* and 141*i*, respectively, and a portion of common bussing system 157 running between subsystems 10*a* and 10*i*. Subsystem 10*i* is the mirror image of subsystem 10*a* and hence both subsystems conveniently face common bussing system 157 for access thereto. Common bussing system 157 is comprised of a plurality of metal conductors adherently formed on an insulated oxide layer over diffused interconnects 146. The oxide layer is sufficient to prevent any interference between the electrical signals traveling along common bussing system 157 and those traveling along diffused interconnects 146.**

The various electrical signal functions necessary for operation of the subsystem circuits are provided for the subsystems by common bussing system 157. The electrical signal functions are then transmitted along high conductivity diffused interconnects 146 via the enable circuits 141 to the test pads 140 and hence to the subsystems. The only portion of the two subsystems which are shown in FIG. 7 are the test pads $TP_1$-$TP_{21}$ associated with subsystem **10*a* and $TP_1'$-$TP_{21}'$ associated with subsystem 10*i* and portions of conductors such as 151 running from the test pads into the various circuits of subsystems 10*a* and 10*i*.** The electrical signal functions associated with each of the test pads $TP_1$-$TP_{21}$ and $TP_1'$-$TP_{21}'$ are shown in TABLE I.

TABLE I

| TEST PADS | FUNCTION |
|---|---|
| $TP_1$—$TP_1'$ | $V_{GG}$ — gate voltage |
| $TP_2$—$TP_2'$ | GATE |
| $TP_3$—$TP_3'$ | $V_{DD}$ — operating voltage |
| $TP_4$—$TP_4'$ | $\Phi_1$ — phased clock pulses |
| $TP_5$—$TP_5'$ | $\Phi_3$ — phased clock pulses |
| $TP_6$—$TP_6'$ | $\Phi_4$ — phased clock pulses |
| $TP_7$—$TP_7'$ | $\Phi_2$ — phased clock pulses |
| $TP_8$—$TP_8'$ | $V_{SS}$(GND) |
| $TP_9$—$TP_9'$ | $X_0$ — row address |
| $TP_{10}$—$TP_{10}'$ | $X_1$ — row address |
| $TP_{11}$—$TP_{11}'$ | $X_2$ — row address |
| $TP_{12}$—$TP_{12}'$ | $X_3$ — row address |
| $TP_{13}$—$TP_{13}'$ | R/W — read-write control |
| $TP_{14}$—$TP_{14}'$ | C/S — chip-select control |
| $TP_{15}$—$TP_{15}'$ | $X_4$ — row address |
| $TP_{16}$—$TP_{16}'$ | $Y_0$ — column address |
| $TP_{17}$—$TP_{17}'$ | $Y_1$ — column address |
| $TP_{18}$—$TP_{18}'$ | I/O — input/output |
| $TP_{19}$—$TP_{19}'$ | $Y_2$ — column address |
| $TP_{20}$—$TP_{20}'$ | $Y_3$ — column address |
| $TP_{21}$—$TP_{21}'$ | $Y_4$ — column address |

Take, for example, test pad $TP_9$ which requires a signal function corresponding to the row address bit $X_0$ to be transmitted to the X inverter circuit of the subsystem along conductor 151. Referring to common bussing system 157, conductor 147 has the $X_0$ signal function transmitted through it. Conductor 147 joins diffused interconnect **146*b* at terminal point 145 forming an electrically conductive path from conductor 147 to interconnect 146b. This is accomplished by replacing the oxide insulator between conductor 147 and interconnect 146*b* with a conductive material such as a metal at cross-over point 145. Conductor 146 extends into enable circuit 141*a* and enable circuit 141*i*. Referring to enable circuit 141*a*, conductor 146*b* becomes source 148 of a field effect transistor of enable circuit 141*a*. A second diffused conductor 149 is electrically connected to metal conductor 152 at terminal 153. Test pad $TP_9$ is an expanded portion of conductors 151 and 152 which, in essence, is a single conductor. Conductor 148 of one conductivity type (P) is spaced apart from conductor 149 of the same conductivity type (P) by channel region 150 of opposite conductivity type (N) which region 150 is actually part of N-type substrate 11 (FIG. 2). Single gate 142 extends over all of the field effect transistors of enable circuit 141*a* forming P-channel enhancement mode MOS switches. Between channel region 150 and gate 142 is a relatively thin oxide layer. When gate 142 is biased with negative gate voltage $V_{GG}$, all of the field effect transistors of enable circuit 141*a* are turned on allowing the signal functions transmitted through the conductors of common bussing system 157 to be transmitted to subsystem 10*a*. Thus, the signal function $X_0$ transmitted along conductor 147 of common bussing system 157 is transmitted along conductor 146*b* through biased enable circuit 141*a*, along conductor 149, along conductor 152, and finally along conductor 151 to the X inverter circuit of subsystem 10*a*. The signal functions associated with test pads TP4-TP7 are clock generator voltage pulse signals of clock phases $\phi_1$-$\phi_4$. More power is required of the clock pulse signal than the address signals, for example, and therefore larger field effect transistors 144*a*–144*d* are required for transmission of the clock pulse signals to subsystem 10*a*. Referring to field effect transistor 144*c*, for example, a large diffused conductor 146*c* becomes the source of the transistor and another large diffused conductor 154 becomes the drain of the transistor. A serpentine shaped spaced region of opposite conductivity type (N) 155 between conductor 154 and conductor 156 becomes the channel region over which is formed a relatively thin adherent oxide insulator material so that gate 142 will turn on field effect transistor 144*c*.**

Figure 8:
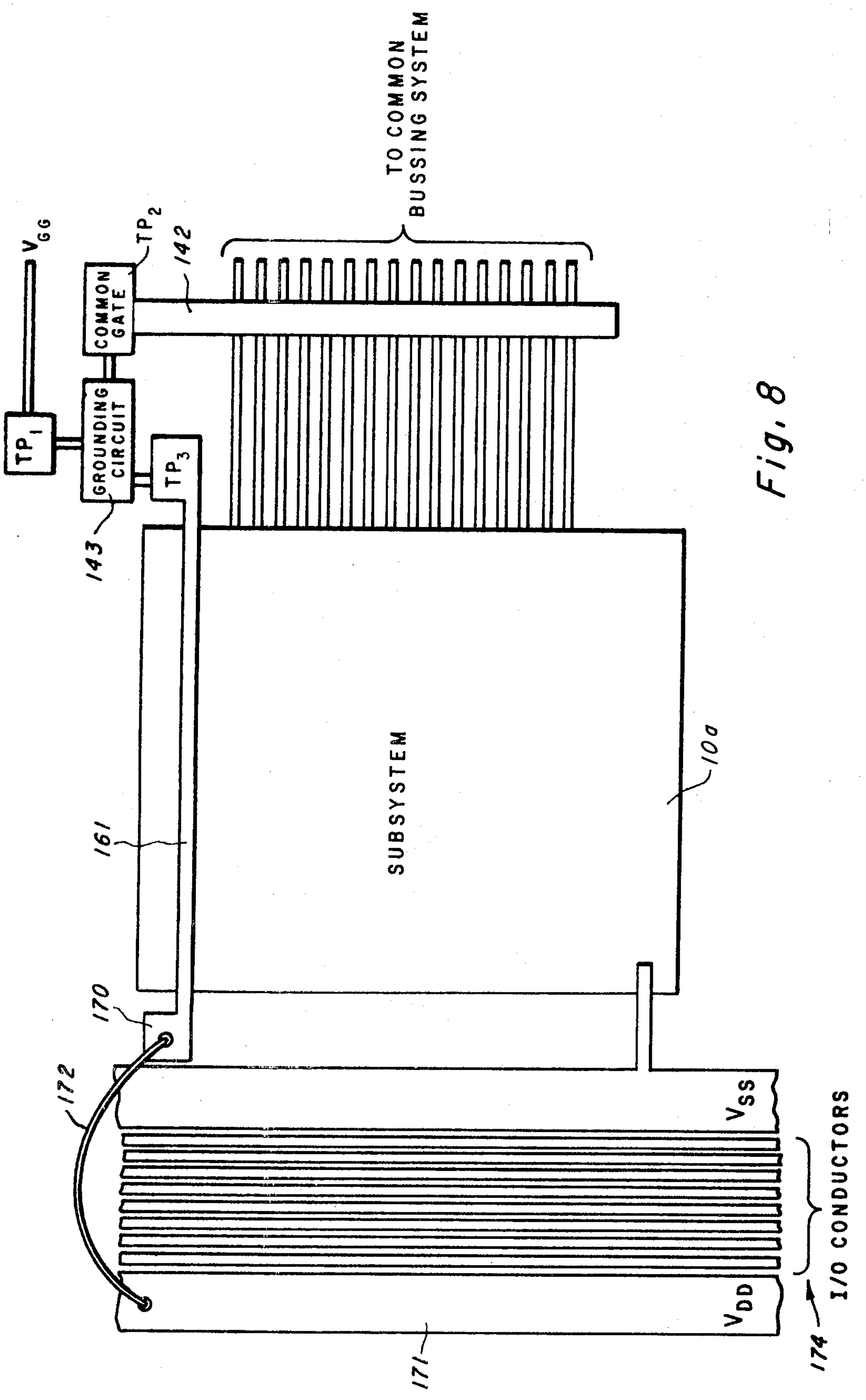
FIG. 8 is a plan view of a portion of the memory system of FIG. 1 pointing out in particular the automatic grounding circuit for the MOS enable circuit.

In addition, it should be noted that the automatic grounding circuit switch mentioned previously is utilized in conjunction with enable circuits 141 of the field effect transistor random access memory system. Again referring to enable circuit **141*a*, its associated automatic grounding system is designated by the numeral 143. Gate voltage $V_{GG}$ is transmitted along conductor 158 of common bussing system 157. Voltage $V_{GG}$ is then transmitted to automatic grounding circuit 143 through diffused conductor 160 via conductive terminal 159. Voltage $V_{DD}$, which is utilized to switch automatic grounding circuit 143 from the ground position to a position whereby voltage $V_{GG}$ is transmitted to gate 142, is transmitted to circuit 143 by conductor 161. Referring to FIG. 8, conductor 161 which supplies operating voltage $V_{DD}$ to the circuits of subsystem 10*a* extends through subsystem 10*a* to bonding pad 170. Supply voltage $V_{DD}$ is transmitted to all of the subsystems through metal conductor 171, only a portion of which is shown in FIG. 8. Supply voltage $V_{DD}$ is transmitted to the subsystem and to automatic grounding circuit 143 by completing an electrically conductive path between conductor 171 and bonding pad 170.**

This is accomplished by bonding a single conductive wire 172 to bonding pad 170 and to $V_{DD}$ conductor 171. Also shown in FIG. 8 is the $V_{SS}$ conductor 173 which is utilized as ground for the various subsystems. In some instances, improved operation of the insulated gate field effect memory subsystems 10 is achieved by connecting $V_{SS}$ conductor 173 to a slightly positive voltage rather than to zero voltage for ground. In addition, portions of the eight Group I input/output (I/O) conductors 174 for subsystems 10*a*–10*h* in the first column of the memory system are shown.

Figure 9:
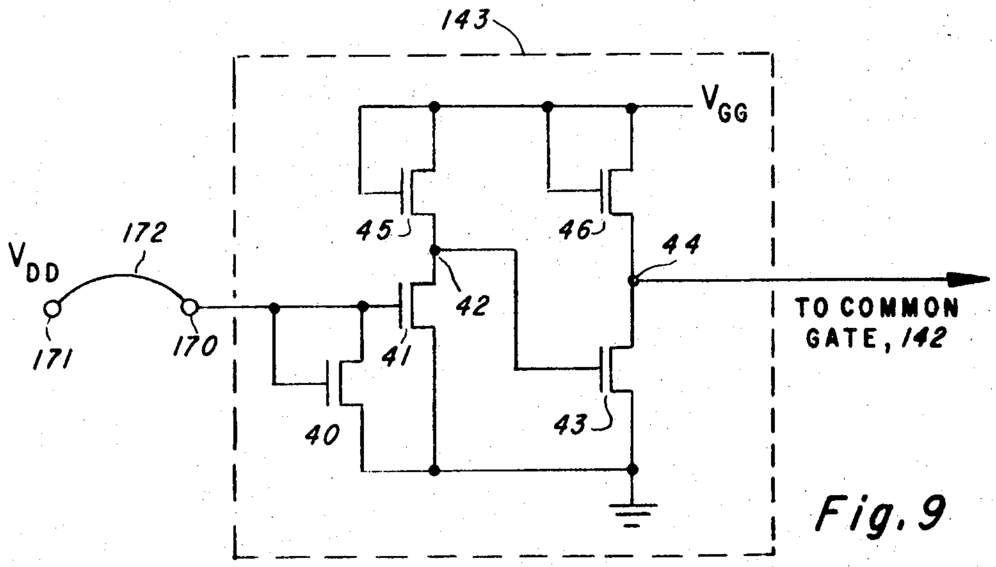
FIG. 9 is a circuit diagram of the automatic grounding circuit.

The automatic grounding circuit is illustrated in detail in FIG. 9. A gate-shorted-to-drain field effect transistor 40 provides a high resistance path to ground. In this circuit, when $V_{DD}$ (approximately negative 16 volts) at terminal 171 is connected to bonding pad 170 by wire 172, the high resistance path to ground provided by transistor 40 is effectively overcome, providing a gate bias voltage for turning on field effect transistor 41. The output of transistor 41 at terminal 42 is then applied to the gate of field effect transistor 43 which is then turned off. Field effect transistor 43 is connected to common gate 142*a* at terminal 44. The drain of transistors 41 and 43 are coupled to voltage supply $V_{GG}$ (about negative 24 volts in this circuit) by gate shorted to drain field effect transistors 45 and 46 which act as load resistors for transistors 41 and 43, respectively. Consequently, when wire 172 is connected between $V_{DD}$ terminal strip 171 and bonding pad 170, $V_{GG}$ is applied to gate 142*a* which turns on the field effect transistors comprising enable circuit 141*a* and enables subsystem 10*a*. When wire 172 is disconnected, the voltage to common gate 142*a* is kept at a zero logic level (less than one threshold voltage $V_T$) by the one megaohm resistance between terminal 170 and ground provided by transistor 40 since transistor 41 is turned off, transistor 43 is turned on, and terminal 44 is effectively grounded. Terminal 44 being effectively grounded, the field effect transistors (26, 27, . . . , 28, 144*a–d* shown in FIGS. 6 and 7) are turned off and thereby disable subsystem 10*a*.

A memory system using the grounding circuit of the invention is described in detail in the following copending applications assigned to the assignee of this invention: Ser. No. 110,216, filed Jan. 27, 1971; Ser. No. 142,957, filed May 13, 1971; Ser. No. 172,462, filed Aug. 17, 1971. The disclosure of such system is incorporated herein by reference.

It is contemplated that in the memory system described in said copending applications, more than 17 acceptable subsystems may be available. Thus, memory systems having a capacity greater than 17,408 or having additional bits to perform additional functions may be fabricated. Furthermore, a larger number of subsystems may be fabricated on substrate 11 to provide larger storage capacity, such as one memory system having words of 32 bits or two memory systems with each having words of 16 bits. Therefore, a variable number of subsystems and associated common bussing networks and interconnect networks may be fabricated on a single slice to selectively produce a complex random access memory system having variable bit capacity and word length.

Although the foregoing description has illustrated embodiments incorporating MOS-ALSI, the principles underlying my inventions are applicable to embodiments including other types of subsystems such as, and without limitation, those featuring charge-coupled devices, magnetic bubbles, amorphous glasses, and other types of systems/subsystems technologies. Thus, for example, subsystem arrays of charge-coupled memory devices could be selectively activated by enabling circuits in accordance with the principles given above. Moreover, it will be evident that my inventions may find expression in circuits having direct interconnecting paths which may be employed rather than a common bus; or that, similarly, if manufacturing yields should be sufficient to make it attractive, testing could initially involve an entire configuration, so that only if such test revealed that one or more subsystems was operatively outside the scope of predetermined specifications, the individual testing and selective interconnection would be employed.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention, will, without departing from the spirit and scope of the invention, be apparent to persons skilled in the art.

What is claimed is:

1. A field-effect-transistor switching circuit comprising:

a source of bias voltage, a ground, a first field-effect-transistor having its gate shorted to drain, its source connected to ground, providing resistive means, a second field-effect-transistor having its gate connected to said bias voltage and to said first field-effect-transistor, a third field-effect-transistor having its output as the switching circuit output and its gate coupled to the output of said second field-effect-transistor, a second voltage supply coupled to the drains of said second and third field-effect-transistors, and means to disconnect the connection between the gate of said second field-effect-transistor and said bias source to switch the circuit output.

2. The field-effect-transistor switching circuit claimed in claim 1 having fourth and fifth field-effect-transistors with gates shorted to drain connected as load resistors in the drain connections of said second and third field-effect-transistors respectively.

3. The field-effect-transistor switching circuit claimed in claim 1 having the source of said first, second and third field-effect-transistors connected to said ground.

* * * * *